(12) United States Patent
Masuno et al.

(10) Patent No.: US 7,899,322 B2
(45) Date of Patent: Mar. 1, 2011

(54) PHOTOGRAPHING APPARATUS AND METHOD, AND PROGRAM

(75) Inventors: Tomonori Masuno, Tokyo (JP); Shinichiro Gomi, Chiba (JP); Masaru Suzuki, Tokyo (JP); Yusuke Nakamura, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/554,388

(22) Filed: Sep. 4, 2009

(65) Prior Publication Data

US 2010/0074613 A1    Mar. 25, 2010

(30) Foreign Application Priority Data

Sep. 8, 2008    (JP) .......................... P2008-229309

(51) Int. Cl.
G03B 13/10    (2006.01)
G03D 13/00    (2006.01)

(52) U.S. Cl. ...................................... 396/378; 396/661

(58) Field of Classification Search ................. 396/378, 396/661
See application file for complete search history.

(56) References Cited

U.S. PATENT DOCUMENTS 5,812,193 A * 9/1998 Tomitaka et al. ............ 348/369
5,949,504 A * 9/1999 Kim ............................ 349/59
7,711,258 B2 * 5/2010 Yanagi ......................... 396/88
2009/0303351 A1 * 12/2009 Ogawa ..................... 348/231.6
2010/0208045 A1 * 8/2010 Willmann et al. ............. 348/62

FOREIGN PATENT DOCUMENTS

JP    3833486    7/2006

* cited by examiner

*Primary Examiner* — Rodney E Fuller
(74) *Attorney, Agent, or Firm* — Finnegan, Henderson, Farabow, Garrett & Dunner, L.L.P.

(57) ABSTRACT

A photographing apparatus includes the following elements. A photographing unit photographs an object. A position detecting unit detects the position of the photographing apparatus. A direction detecting unit detects the direction of the photographing apparatus when the object is photographed. An angle-of-view detecting unit detects the angle of view of the photographed image. A recommended-composition information obtaining unit obtains recommended-composition information including a recommended angle of view of the image photographed at the detected position and a recommended direction. An angle-of-view comparing unit compares the detected angle of view with the recommended angle of view. An angle-of-view adjusting unit adjusts the angle of view in accordance with the result of the comparison. A direction comparing unit compares the detected direction with the recommended direction. A presenting unit presents, in accordance with the result of the comparison, direction-change instruction information for instructing the direction of the photographing apparatus to be changed.

9 Claims, 15 Drawing Sheets

PHOTOGRAPHING APPARATUS AND METHOD, AND PROGRAM

BACKGROUND OF THE INVENTION

1. Field of the Invention

The present invention relates to a photographing apparatus and method and a program. More specifically, the present invention relates to a photographing apparatus and method and a program in which a photographic point in a sightseeing spot or the like can be presented to a user with a small amount of data.

2. Description of the Related Art

Some recent photographing apparatuses such as digital cameras have an assistant function for automatically setting up the best composition or automatically setting photographic conditions depending on the situation when a user photographs an object.

For example, a photographing apparatus configured such that a recommended-composition image at a photographing position obtained as global positioning system (GPS) information and a photographic image to be captured by a user are superimposed and displayed has been proposed (see, for example, Japanese Patent No. 3833486).

SUMMARY OF THE INVENTION

In the technique disclosed in Japanese Patent No. 3833486, however, it is necessary to obtain or store a recommended-composition image used as a sample image in accordance with a photographing position. Thus, the process of obtaining a recommended-composition image from a server or the like each time photographing is performed can involve considerable time depending on the communication state. Further, the process of storing a recommended-composition image in advance may lead to extra consumption of the memory capacity because a recommended-composition image is stored in addition to a photographed image.

It is therefore desirable to present a photographic point in a sightseeing spot or the like to a user with a small amount of data.

According to an embodiment of the present invention, a photographing apparatus includes the following elements. Photographing means photographs an object. Position detecting means detects a position of the photographing apparatus. Direction detecting means detects a direction in which the photographing apparatus is oriented when the photographing means photographs the object. Angle-of-view detecting means detects an angle of view of an image photographed by the photographing means. Recommended-composition information obtaining means obtains recommended-composition information based on the position detected by the position detecting means, the recommended-composition information including a recommended angle of view of the image photographed at the position and a recommended direction of the photographing apparatus. Angle-of-view comparing means compares the angle of view detected by the angle-of-view detecting means with the recommended angle of view. Angle-of-view adjusting means adjusts the angle of view detected by the angle-of-view detecting means in accordance with a comparison result obtained by the angle-of-view comparing means. Direction comparing means compares the direction detected by the direction detecting means with the recommended direction. Presenting means presents, in accordance with a comparison result obtained by the direction comparing means, direction-change instruction information for instructing changing of the direction in which the photographing apparatus is oriented when the photographing means photographs the object.

The presenting means can present, in accordance with a comparison result obtained by the direction comparing means, an image of the object and a direction-change instruction image for instructing changing of the direction in which the photographing apparatus is oriented when the photographing means photographs the object.

The photographing apparatus can further include composition determining means for determining whether or not the image presented by the presenting means has a recommended composition, the recommended composition being indicated by the recommended-composition information, and instructs recording of the image when the image has the recommended composition.

The recommended-composition information can further include a name of the object in an image photographed at the position with the recommended angle of view and in the recommended direction, and the presenting means can present the name on the image of the object.

The recommended-composition information obtaining means can obtain the recommended-composition information from recommended-composition information storage means for storing the recommended-composition information, the recommended-composition information storage means being provided in an information processing apparatus externally connected to the photographing apparatus.

The photographing apparatus can further include recommended-composition information storage means for storing the recommended-composition information, and the recommended-composition information obtaining means can obtain the recommended-composition information from the recommended-composition information storage means.

According to another embodiment of the present invention, a photographing method includes the steps of photographing an object; detecting a position of a device that photographs the object; detecting a direction in which the device is oriented when the object is photographed in the step of photographing; detecting an angle of view of an image photographed in the step of photographing; obtaining recommended-composition information based on the position detected in the step of detecting a position, the recommended-composition information including a recommended angle of view of the image photographed at the position and a recommended direction; comparing the angle of view detected in the step of detecting an angle of view with the recommended angle of view; adjusting the angle of view detected in the step of detecting an angle of view in accordance with a comparison result obtained in the step of comparing the angle of view; comparing the direction detected in the step of detecting a direction with the recommended direction; and presenting, in accordance with a comparison result obtained in the step of comparing the direction, direction-change instruction information for instructing changing of the direction in which the device is oriented when the object is photographed in the step of photographing.

According to another embodiment of the present invention, a program causes a computer to execute a process comprising the steps of controlling photographing of an object; detecting a position of a device that photographs the object; detecting a direction in which the device is oriented when the object is photographed in the step of controlling photographing; detecting an angle of view of an image photographed in the step of controlling photographing; obtaining recommended-composition information based on the position detected in the step of detecting a position, the recommended-composition information including a recommended angle of view of the image photographed at the position and a recommended direction; comparing the angle of view detected in the step of detecting an angle of view with the recommended angle of view; adjusting the angle of view detected in the step of detecting an angle of view in accordance with a comparison result obtained in the step of comparing the angle of view; comparing the direction detected in the step of detecting a direction with the recommended direction; and performing control to present, in accordance with a comparison result obtained in the step of comparing the direction, direction-change instruction information for instructing changing of the direction in which the device is oriented when the object is photographed in the step of controlling photographing.

According to an embodiment of the present invention, an object is photographed; a position of a device that photographs the object is detected; a direction in which the device is oriented when the object is photographed in the step of photographing is detected; an angle of view of a photographed image is detected; recommended-composition information including a recommended angle of view of the image photographed at the position and a recommended direction is obtained based on the detected position; the angle of view detected in the step of detecting an angle of view is compared with the recommended angle of view; the detected angle of view is adjusted in accordance with the comparison result; the detected direction is compared with the recommended direction; and direction-change instruction information for instructing changing of the direction in which the device is oriented when the object is photographed in the step of photographing is presented in accordance with the comparison result.

According to an embodiment of the present invention, therefore, a photographic point in a sightseeing spot or the like can be presented to a user with a small amount of data.

DESCRIPTION OF THE PREFERRED EMBODIMENTS

Embodiments of the present invention will be described hereinafter with reference to the drawings.

First Embodiment

Figure 1:
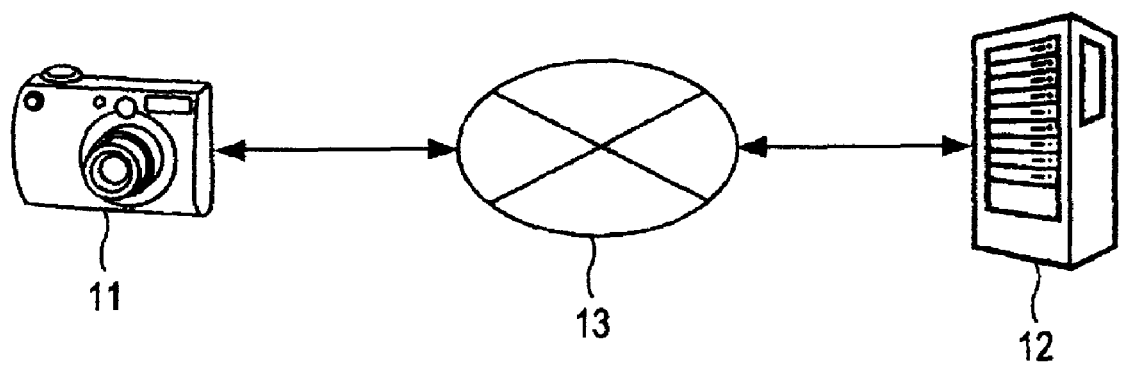
FIG. 1 is a diagram showing an example of a photographing apparatus according to an embodiment of the present invention.

FIG. 1 is a diagram showing an example of a photographing apparatus according to an embodiment of the present invention.

In FIG. 1, a photographing apparatus 11 and a server 12 are connected to each other via a network 13.

When a user enters a photographing instruction, the photographing apparatus 11 shown in FIG. 1 requests the server 12 via the network 13 about information indicating the best composition (composition of a famous landscape or building) at a corresponding photographing position. The server 12 has a database in which each photographing position is associated with information indicating the composition (recommended composition) recommended at the photographing position (recommended-composition information). In response to a request from the photographing apparatus 11, the server 12 sends the recommended-composition information corresponding to the photographing position. The photographing apparatus 11 obtains the recommended-composition information, which has been sent from the server 12, from the server 12 via the network 13. The network 13 may be, for example, the Internet. The photographing apparatus 11 may be connected to the network 13 through, for example, a base station (not shown). The number of photographing apparatuses 11 which are connected to the network 13 is not limited to one. A plurality of photographing apparatuses 11 may be connected to the network 13.

An example functional configuration of the photographing apparatus 11 will now be described with reference to a block diagram shown in FIG. 2.

Figure 2:
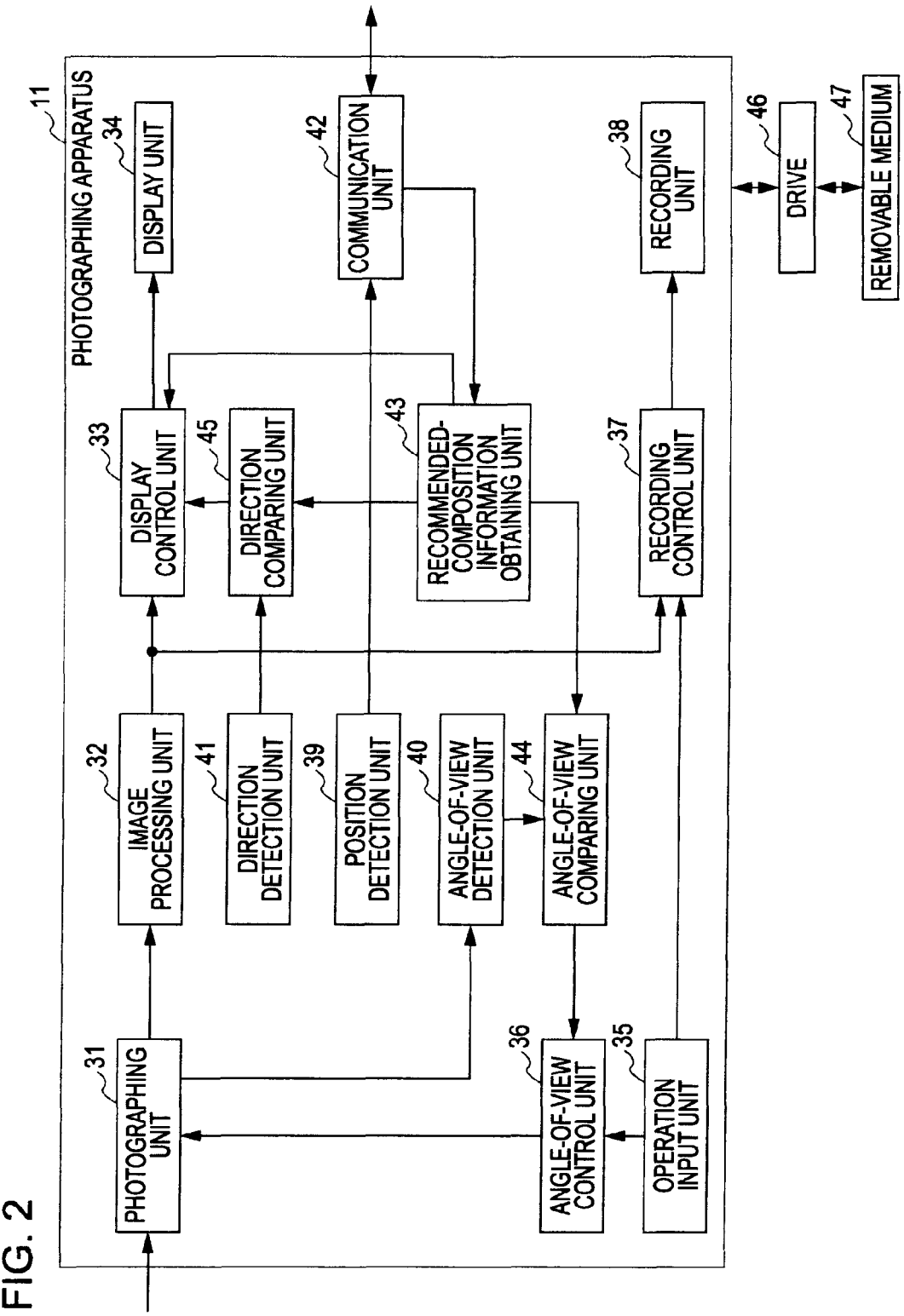
FIG. 2 is a block diagram showing an example functional configuration of the photographing apparatus.

The photographing apparatus 11 shown in FIG. 2 includes a photographing unit 31, an image processing unit 32, a display control unit 33, a display unit 34, an operation input unit 35, an angle-of-view control unit 36, a recording control unit 37, a recording unit 38, a position detection unit 39, an angle-of-view detection unit 40, a direction detection unit 41, a communication unit 42, a recommended-composition information obtaining unit 43, an angle-of-view comparing unit 44, and a direction comparing unit 45.

Further, a drive 46 is connected to the photographing apparatus 11 as necessary. A removable medium 47 such as a magnetic disk, an optical disk, a magneto-optical disk, or a semiconductor memory is placed in the drive 46 as desired. The drive 46 is controlled by a control unit (not shown) to install or record a computer program or data read from the removable medium 47 placed therein into the recording unit 38 as necessary.

The photographing unit 31 is configured to include an optical lens, an image pickup element, and an analog-to-digital (A/D) conversion unit (all of which are not shown). The photographing unit 31 captures an image of an object by receiving, using the image pickup element, light incident on the optical lens and performing photoelectric conversion on the received light, and performs A/D conversion on a resulting analog image signal. The photographing unit 31 supplies digital image data obtained as a result of the A/D conversion to the image processing unit 32.

The image processing unit 32 performs digital signal processing on the image data from the photographing unit 31, such as noise removal, and supplies resulting image data to the display control unit 33 and the recording control unit 37.

The display control unit 33 controls displaying of an image on the display unit 34 on the basis of the image data supplied from the image processing unit 32. The display control unit 33 also controls displaying of a direction-change instruction image on the display unit 34 on the basis of a comparison result supplied from the direction comparing unit 45. The direction-change instruction image may be an image for instructing the user to change the photographing direction. The comparison result supplied from the direction comparing unit 45 will be described below.

The operation input unit 35 detects a user operation that has been performed on various buttons disposed on the photographing apparatus 11, such as a shutter button, a power button, a zoom button, a cursor command button, and a menu button (all of which are not shown), and supplies a signal (operation signal) corresponding to the user operation to the angle-of-view control unit 36 and the recording control unit 37.

The angle-of-view control unit 36 controls the focal length in the photographing unit 31 on the basis of an operation signal supplied from the operation input unit 35 or a comparison result supplied from the angle-of-view comparing unit 44 to adjust the angle of view. The comparison result supplied from the angle-of-view comparing unit 44 will be described below.

The recording control unit 37 controls recording of the image data supplied from the image processing unit 32 onto the recording unit 38 on the basis of an operation signal supplied from the operation input unit 35 which corresponds to a user operation that has been performed on the shutter button.

The position detection unit 39 may be, for example, a GPS sensor. Upon receipt of a radio wave from a geodetic satellite, the position detection unit 39 sends position information indicating a measured current position of the photographing apparatus 11 to the server 12 through the communication unit 42.

The angle-of-view detection unit 40 calculates an angle of view from the focal length in the photographing unit 31 and a frame size, and supplies the angle of view to the angle-of-view comparing unit 44.

The direction detection unit 41 includes, for example, an electronic compass and an acceleration sensor. The electronic compass is composed of a magnetic element such as a Hall element and is configured to detect a geomagnetic direction to detect the azimuth. The acceleration sensor is configured to detect the inclination (elevation angle). Therefore, the direction detection unit 41 detects the azimuth and elevation angle of the photographing apparatus 11 that is directed toward the object during photographing, and supplies the azimuth and elevation angle to the direction comparing unit 45.

The communication unit 42 may be a network interface or the like. The communication unit 42 establishes a communication with an external device (e.g., the server 12) via the network 13 such as the Internet.

The recommended-composition information obtaining unit 43 obtains recommended-composition information indicating a composition to be obtained at the photographing position, which has been sent from the server 12 through the communication unit 42. The recommended-composition information includes at least recommended-angle-of-view information and recommended-direction information. The recommended-angle-of-view information indicates an angle of view at which the recommended composition is obtained at the photographing position, and the recommended-direction information indicates a direction (azimuth and elevation angle) in which the recommended composition is obtained at the photographing position. The recommended-composition information obtaining unit 43 supplies the recommended-angle-of-view information included in the obtained recommended-composition information to the angle-of-view comparing unit 44, and supplies the recommended-direction information included in the recommended-composition information to the direction comparing unit 45.

The angle-of-view comparing unit 44 compares the current angle of view supplied from the angle-of-view detection unit 40 with a recommended angle of view indicated by the recommended-angle-of-view information supplied from the recommended-composition information obtaining unit 43, and supplies a comparison result to the angle-of-view control unit 36. The angle-of-view control unit 36 adjusts the current angle of view on the basis of the comparison result supplied from the angle-of-view comparing unit 44.

The direction comparing unit 45 compares the current direction (azimuth and elevation angle) supplied from the direction detection unit 41 with a recommended direction indicated by the recommended-direction information supplied from the recommended-composition information obtaining unit 43, and supplies a comparison result to the display control unit 33. The display control unit 33 causes the display unit 34 to display a direction-change instruction image for instructing the user to change the photographing direction on the basis of the comparison result supplied from the direction comparing unit 45.

An example functional configuration of the server 12 will now be described with reference to a block diagram shown in FIG. 3.

Figure 3:
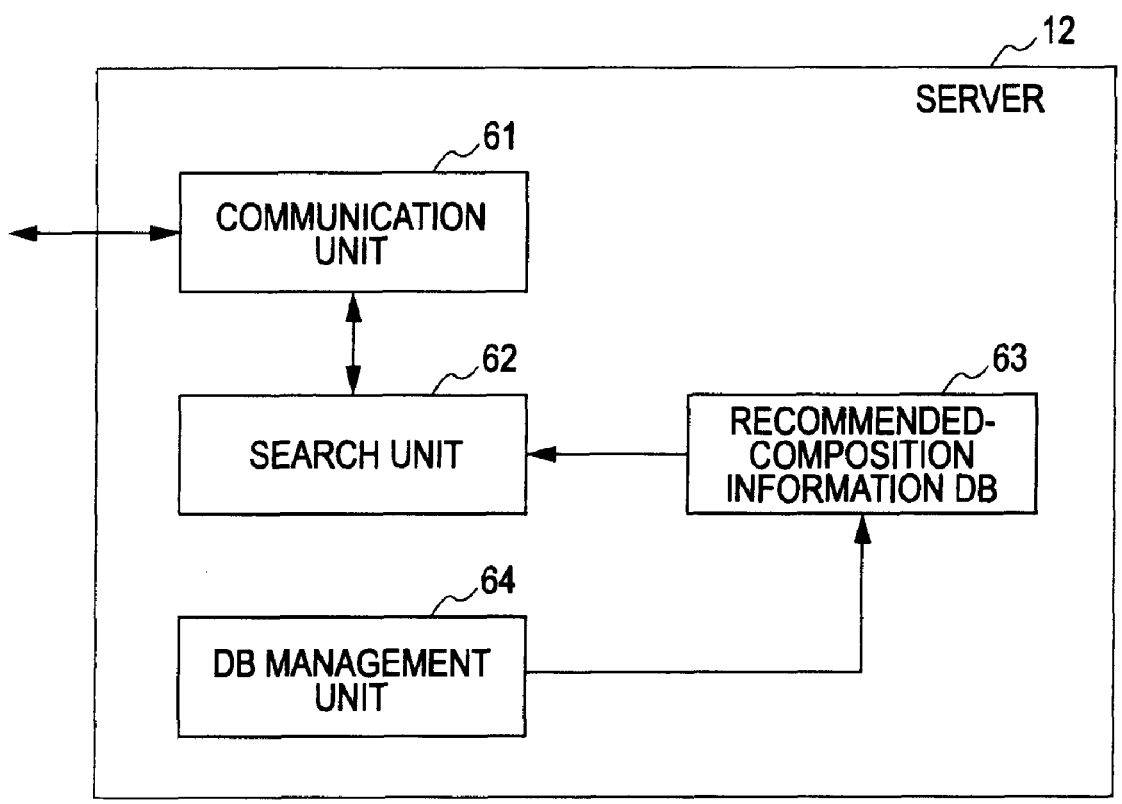
FIG. 3 is a block diagram showing an example functional configuration of a server.

The server 12 shown in FIG. 3 includes a communication unit 61, a search unit 62, a recommended-composition information database (DB) 63, and a DB management unit 64.

The communication unit 61 may be a network interface or the like. The communication unit 61 establishes a communication with an external device (e.g., the photographing apparatus 11) via the network 13 such as the Internet.

The search unit 62 searches the recommended-composition information DB 63 for, based on position information indicating the current position of the photographing apparatus 11, which has been received from the photographing apparatus 11 through the communication unit 61, recommended-composition information corresponding to the position information, and sends the detection result (i.e., the recommended-composition information) to the photographing apparatus 11 through the communication unit 61.

The recommended-composition information DB 63 stores, under management of the DB management unit 64, position information indicating photographing positions, which has been input from an input unit (not shown), and recommended-composition information indicating recommended compositions to be obtained at the photographing positions so that the position information and the recommended-composition information are associated with each other.

The DB management unit 64 manages the data stored in the recommended-composition information DB 63 (that is, the position information and the recommended-composition information), and performs processing such as addition, update, or deletion of data in accordance with an instruction from the input unit (not shown).

Next, a recommended-composition presentation process of the photographing apparatus 11 and a recommended-composition information providing process of the server 12 will be described with reference to a flowchart shown in FIG. 4.

In step S11, the position detection unit 39, angle-of-view detection unit 40, direction detection unit 41 of the photographing apparatus 11 detect the current position, the current angle of view, and the direction (azimuth and elevation angles), respectively.

In step S12, the position detection unit 39 sends position information indicating the detected current position to the server 12 through the communication unit 42. The process proceeds to step S31. At this time, the angle-of-view detection unit 40 supplies the detected (calculated) angle of view to the angle-of-view comparing unit 44, and the direction detection unit 41 supplies the detected direction to the direction comparing unit 45.

In step S31, the search unit 62 of the server 12 receives the position information indicating the current position of the photographing apparatus 11, which has been sent from the photographing apparatus 11.

In step S32, the search unit 62 searches the recommended-composition information DB 63 for, based on the position information, the recommended-composition information corresponding to the position information.

Here, the search for recommended-composition information by the search unit 62 will now be described with reference to FIGS. 5 and 6.

Figure 5:
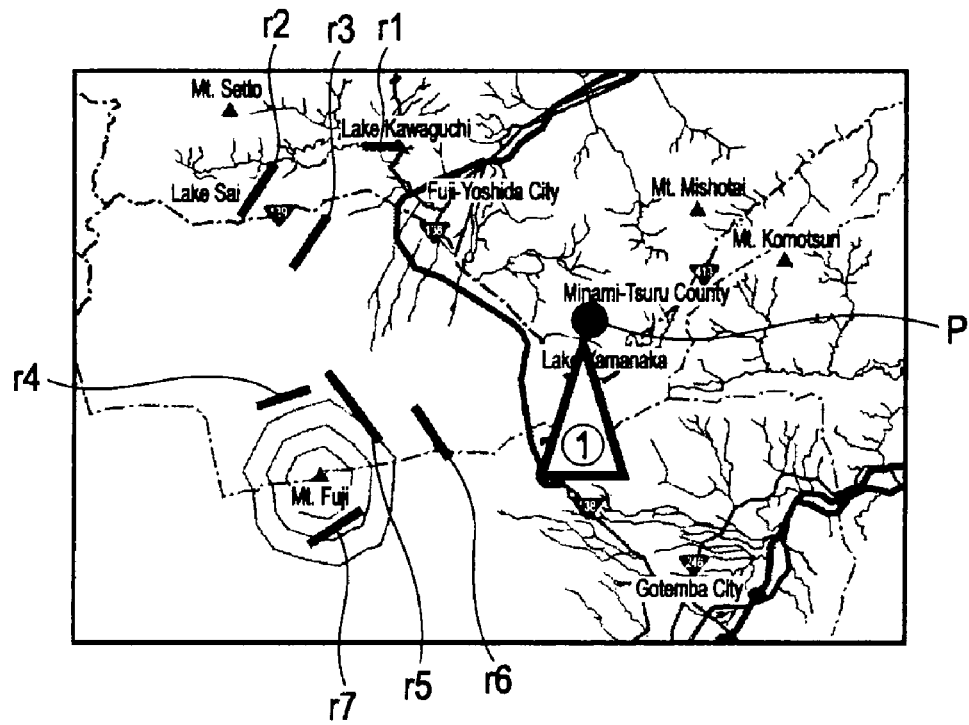
FIG. 5 is a diagram illustrating a search for recommended-composition information.

FIG. 5 is a conceptual diagram showing the correspondence between the current position of the photographing apparatus 11 and the recommended-composition information stored in the recommended-composition information DB 63.

In a map shown in FIG. 5, a plot P represents the current position of the photographing apparatus 11, and an isosceles triangle whose apex is the plot P (indicated by the encircled "1") represents the azimuth to which the photographing apparatus 11 is directed at the plot P and the angle of view. That is, in the map shown in FIG. 5 where north is up, the photographing apparatus 11 at the position corresponding to the plot P is directed toward the south.

In FIG. 5, furthermore, line segments r1 to r7 indicate recommended-composition information associated with position information regarding positions near the current position indicated by the plot P in the recommended-composition information DB 63. In other words, each of the line segments r1 to r7 indicates a plane where a recommended composition is obtained.

Figure 6:
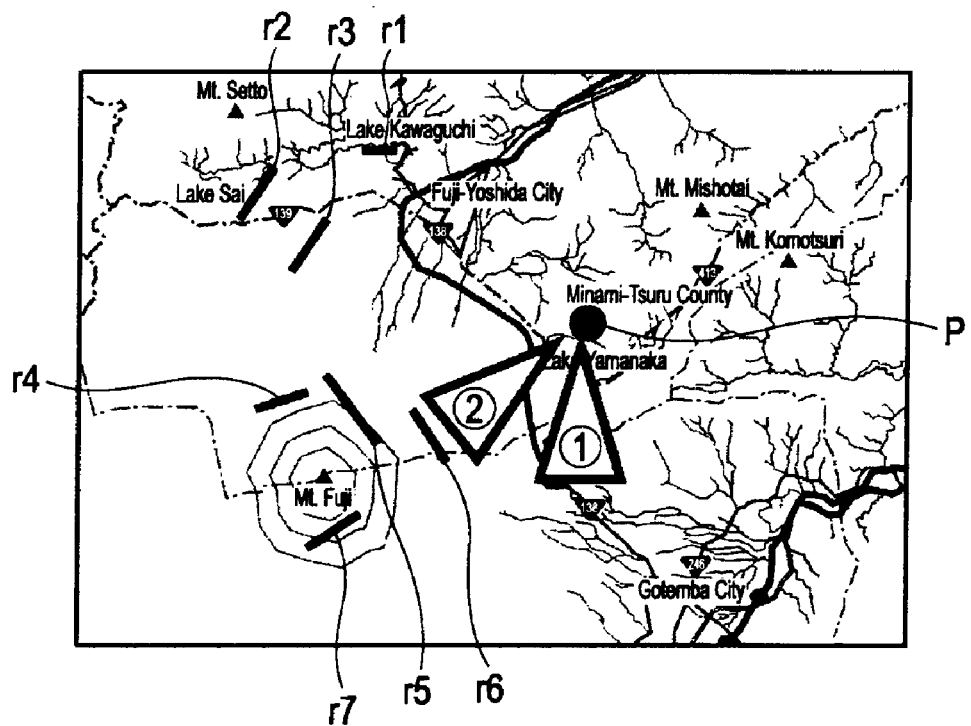
FIG. 6 is a diagram illustrating a search for recommended-composition information.

When the search unit 62 searches for recommended-composition information on the basis of the position information received from the photographing apparatus 11 in the state shown in FIG. 5, as shown in FIG. 6, recommended-composition information corresponding to the line segment r6 is found. That is, the composition indicated by the line segment r6 is the best composition as the composition of photographing at the current position indicated by the plot P. The angle of view (recommended angle of view) and azimuth (recommended azimuth) obtained at this time are represented by an isosceles triangle whose apex is the plot P, which is indicated by the encircled "2" in FIG. 6. That is, the recommended azimuth at the current position indicated by the plot P is the southwest direction, and the recommended angle of view is represented by the length of the base of the isosceles triangle.

In this manner, the search unit 62 searches for, based on the position information about the photographing apparatus 11, recommended-angle-of-view information corresponding to the position information.

Figure 4:
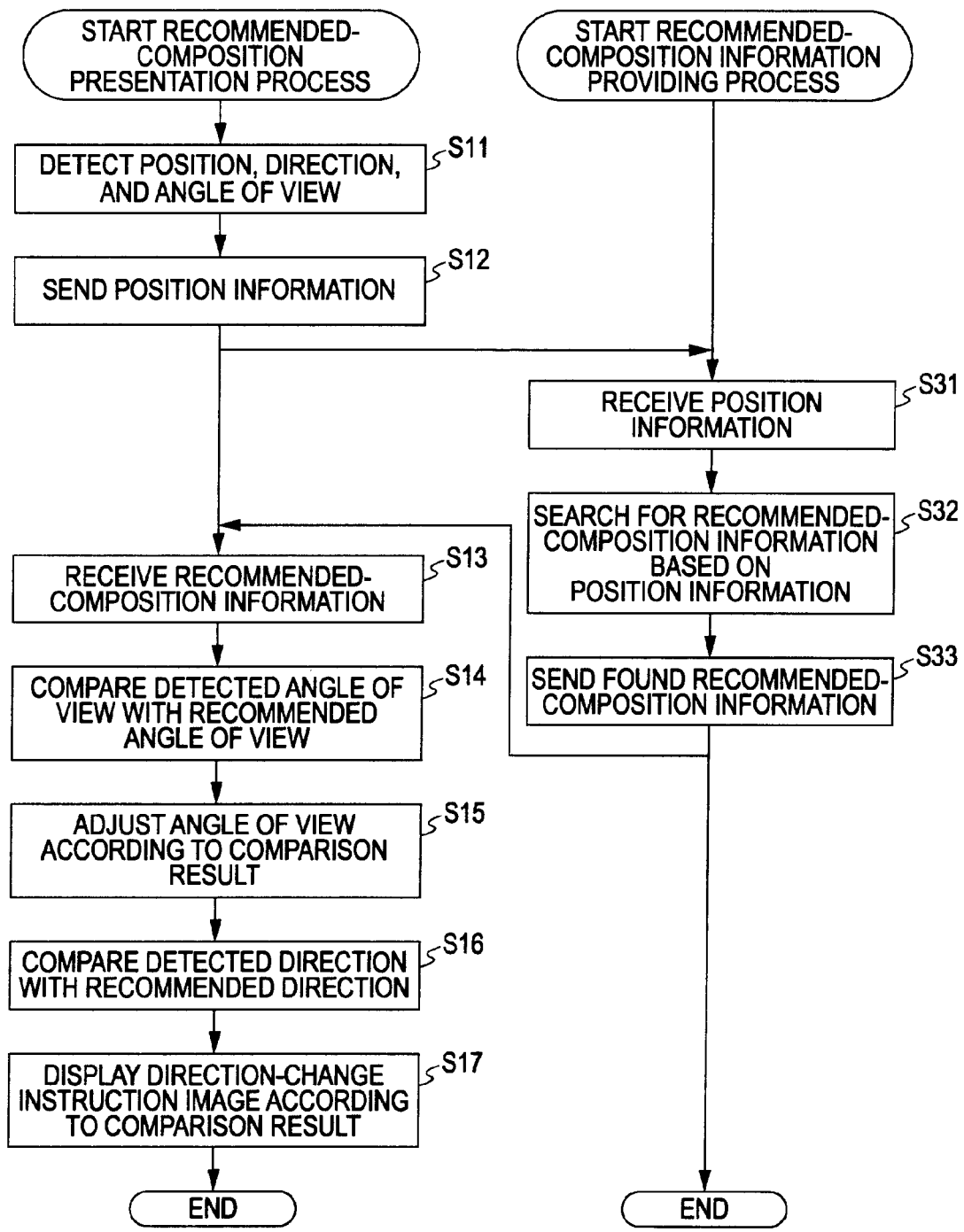
FIG. 4 is a flowchart illustrating a recommended-composition presentation process of the photographing apparatus and a recommended-composition information providing process of the server.

Referring back to the flowchart shown in FIG. 4, in step S33, the search unit 62 sends the found recommended-composition information to the photographing apparatus 11 through the communication unit 61. The process proceeds to step S13.

In step S13, the recommended-composition information obtaining unit 43 of the photographing apparatus 11 receives (obtains) the recommended-composition information sent from the server 12 through the communication unit 42. The recommended-composition information obtaining unit 43 supplies recommended-angle-of-view information included in the obtained recommended-composition information to the angle-of-view comparing unit 44, and also supplies recommended direction information included in the recommended-composition information to the direction comparing unit 45.

In step S14, the angle-of-view comparing unit 44 compares the current angle of view supplied from the angle-of-view detection unit 40 with a recommended angle of view represented by the recommended-angle-of-view information supplied from the recommended-composition information obtaining unit 43, and supplies a comparison result to the angle-of-view control unit 36.

In step S15, the angle-of-view control unit 36 controls the focal length in the photographing unit 31 according to the comparison result supplied from the angle-of-view comparing unit 44 so that the difference between the current angle of view and the recommended angle of view can be reduced, thereby adjusting the current angle of view.

In step S16, the direction comparing unit 45 compares the current direction (azimuth and elevation angle) supplied from the direction detection unit 41 with a recommended direction indicated by the recommended direction information supplied from the recommended-composition information obtaining unit 43, and supplies a comparison result to the display control unit 33.

Here, the comparison between the current direction and the recommended direction indicated by the recommended direction information will now be described with reference to FIG. 7.

Figure 7:
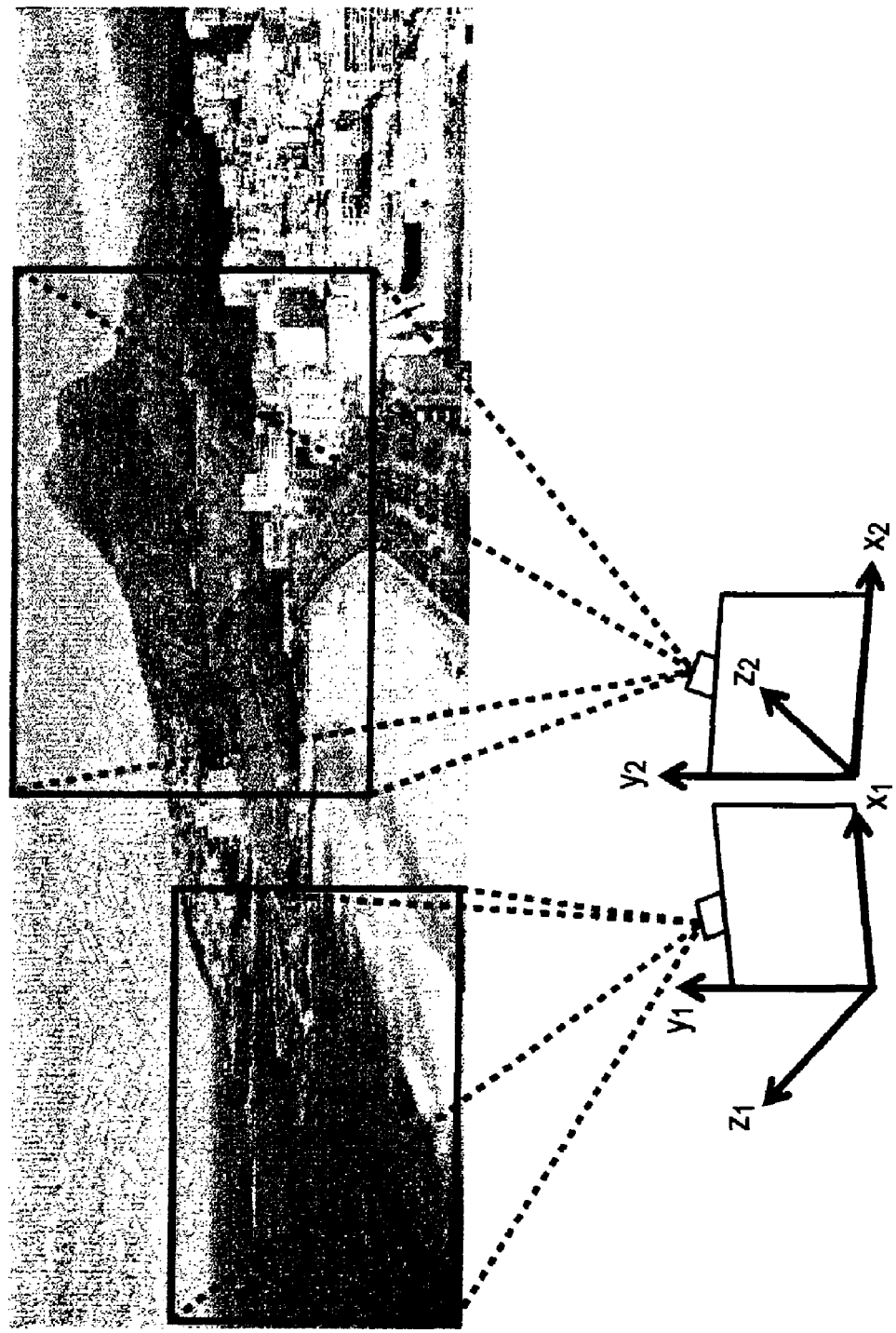
FIG. 7 is a diagram showing the comparison between a current direction and a recommended direction.

In FIG. 7, a composition represented by the $x_1 y_1 z_1$ coordinates is the current composition, and a composition represented by the $x_2 y_2 z_2$ coordinates is the recommended composition. In the illustration of FIG. 7, the origin of the $x_1 y_1 z_1$ coordinates and the origin of the $x_2 y_2 z_2$ coordinates are apart from each other. In actuality, the origins are located at the same point.

In this case, the direction comparing unit 45 calculates the amount of rotation from the $x_1 y_1 z_1$ coordinates to the $x_2 y_2 z_2$ coordinates, and supplies the calculated amount of rotation to the display control unit 33 as a comparison result between the current direction and the recommended direction. That is, the deviation between the direction for photographing the recommended composition and the current direction is calculated as the amount of rotation.

Referring back to the flowchart shown in FIG. 4, in step S17, the display control unit 33 causes the display unit 34 to display an image having the current composition and a direction-change instruction image for instructing the user to change the photographing direction on the basis of the comparison result supplied from the direction comparing unit 45 so that the amount of rotation from the $x_1y_1z_1$ coordinates to the $x_2y_2z_2$ coordinates can be reduced.

Figure 8:
FIG. 8 is a diagram showing an example of a direction-change instruction image.

For example, as shown in FIG. 8, the display control unit 33 may cause an arrow 81 serving as a direction-change instruction image to be displayed (presented) on the right end of the display unit 34.

Figure 9:
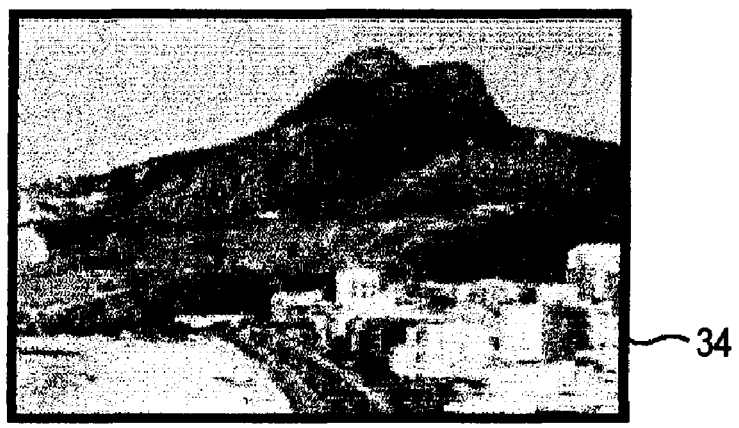
FIG. 9 is a diagram showing an example of a displayed image having a recommended composition.

The process shown in the flowchart of FIG. 4 is repeatedly executed until the comparison result (the amount of rotation) between the current direction and the recommended direction becomes zero in step S16. That is, the user repeats the operation of checking the arrow 81 shown in FIG. 8 and changing the direction of the photographing apparatus 11 to the direction indicated by the arrow 81 is. When the comparison result (the amount of rotation) between the current direction and the recommended direction becomes zero, the arrow 81 disappears, and a recommended composition shown in FIG. 9 is displayed on the display unit 34.

Instead of the arrow 81 serving as a direction-change instruction image shown in FIG. 8, any other technique for instructing the user to change the photographing direction may be used. For example, the user may be instructed to change the photographing direction by speech (direction change instruction speech) output from an audio output unit (not shown).

According to the foregoing process, it is not necessary to obtain a recommended-composition image to be compared with the current composition or store the recommended-composition image in advance, and only recommended-composition information corresponding to the current position is obtained from the server 12. Thus, a photographic point in a sightseeing spot or the like can be presented to a user with a small amount of data.

Consequently, it is not necessary to download a large volume of data during photographing. In addition, extra consumption of the memory capacity can be reduced.

Figure 10:
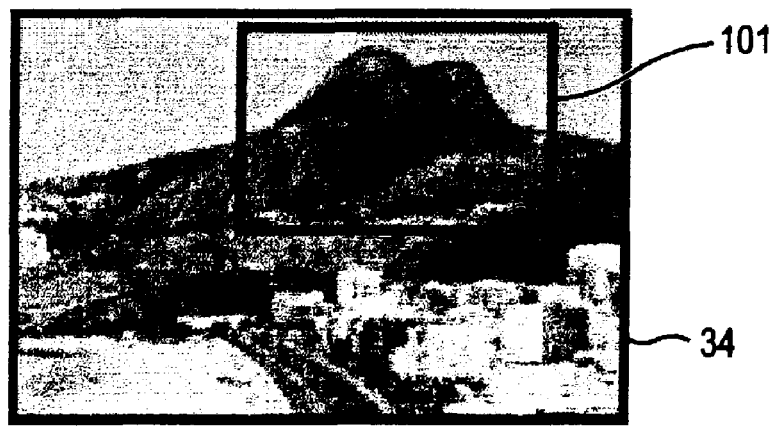
FIG. 10 is a diagram showing another example of a displayed image having a recommended composition.

In the foregoing description, the composition shown in FIG. 9 is the recommended composition. Alternatively, as shown in FIG. 10, a frame 101 indicating a recommended composition may be displayed in a composition obtained when the direction of the photographing apparatus 11 becomes the recommended direction. In this case, the recommended-composition information obtaining unit 43 calculates the size and position of the frame 101 to be displayed on the display unit 34 from the recommended-angle-of-view information, and supplies the calculation results to the display control unit 33. The display control unit 33 causes the frame 101 to be displayed on the display unit 34 on the basis of the calculation results supplied from the recommended-composition information obtaining unit 43.

In FIG. 10, a recommended composition is displayed by adjusting the angle of view in accordance with the frame 101 by the angle-of-view control unit 36, without using the comparison result obtained by the angle-of-view comparing unit 44 between the current angle of view and the recommended angle of view, on the basis of an operation signal supplied from the operation input unit 35 according to a user operation.

Alternatively, for example, the recording control unit 37 may cut out only an image inside the frame 101 shown in FIG. 10 and record the cut-out image onto the recording unit 38.

Figure 11:
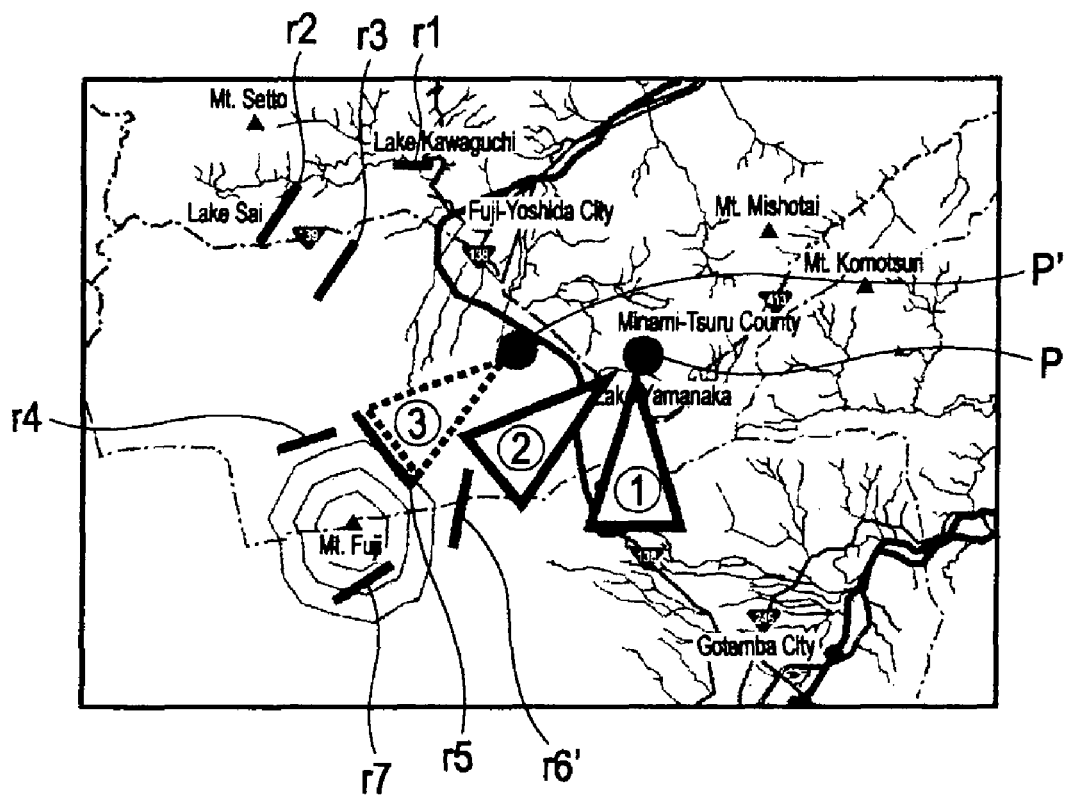
FIG. 11 is a diagram illustrating a search for recommended-composition information.

In the foregoing description, furthermore, it is assumed that the server 12 can find, with certainty, recommended-composition information corresponding to the current position of the photographing apparatus 11. However, for example, as shown in FIG. 11, a composition indicated by a line segment r6' does not face the front of the photographing apparatus 11 positioned at the plot P. That is, recommended-composition information corresponding to the current position of the photographing apparatus 11 may not necessarily be found. In this case, the search unit 62 of the server 12 may search for position information corresponding to a position that is nearest to the current position of the photographing apparatus 11, and may send the resulting position information to the photographing apparatus 11 through the communication unit 61. In FIG. 11, the position corresponding to the position information to be searched for is represented by a plot P', and a recommended angle of view and a recommended direction corresponding to the position information are represented by an isosceles triangle (broken line) indicated by the encircled "3". At this time, in the photographing apparatus 11, based on the position information sent from the server 12, a representation indicating the position of the photographing apparatus 11 (such as latitude and longitude or map information) and a message for prompting the user to move the photographing apparatus 11 are displayed on the display unit 34.

Therefore, even when a user is at a position far from a photographic point in a sightseeing spot or the like, the photographic point can be presented to the user.

While the configuration in which a recommended composition corresponding to the current position of the photographing apparatus 11 is displayed has been described, the name of an object included in the recommended composition may also be displayed in this composition.

Second Embodiment

Figure 12:
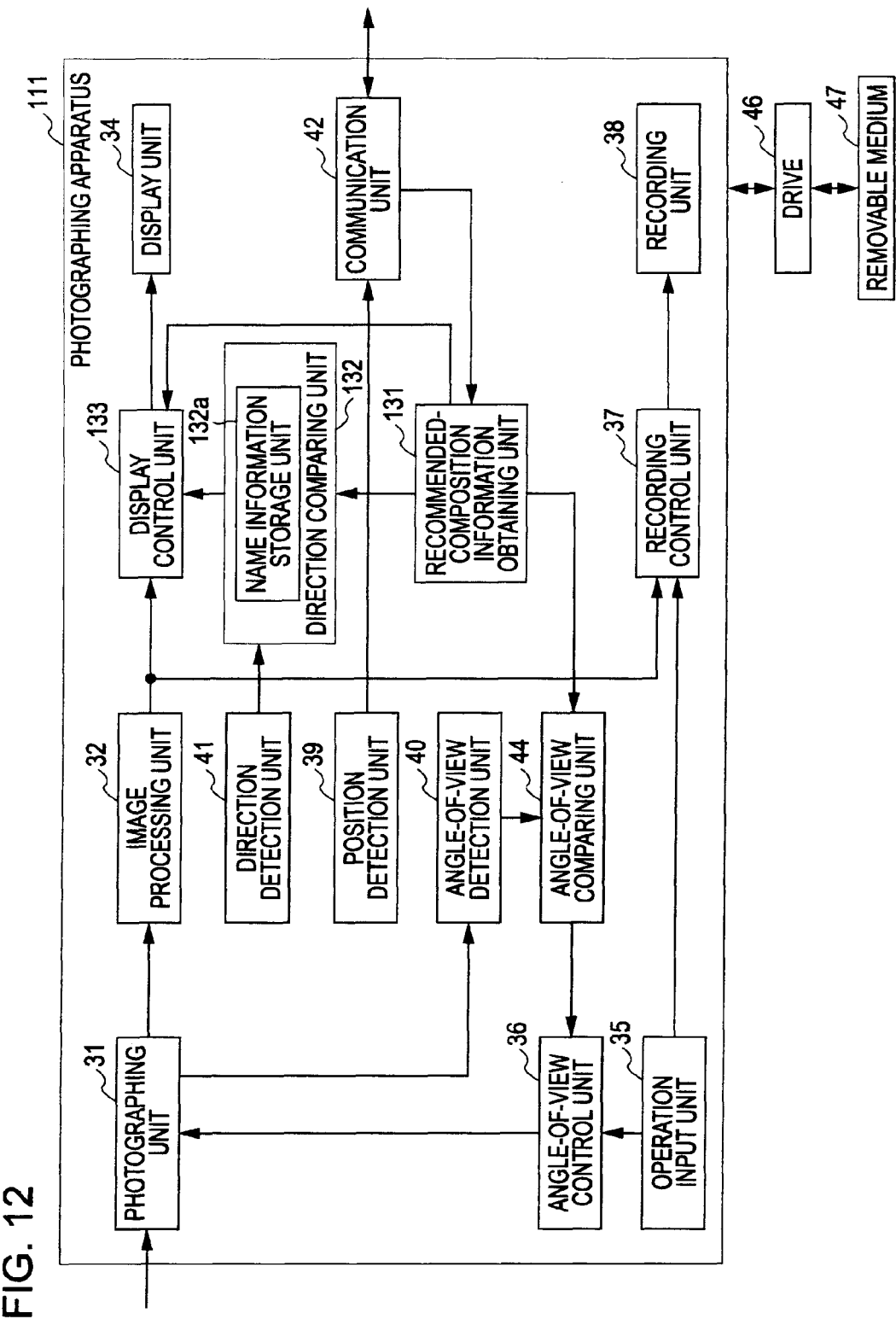
FIG. 12 is a block diagram showing an example functional configuration of a photographing apparatus according to another embodiment of the present invention.

FIG. 12 shows an example configuration of a photographing apparatus 111 configured such that in a recommended composition, the name of an object included in this composition can be displayed. In the photographing apparatus 111 shown in FIG. 12, elements having functions similar to those in the photographing apparatus 11 shown in FIG. 2 are assigned the same names and the same reference numerals, and descriptions thereof are omitted as appropriate.

The photographing apparatus 111 shown in FIG. 12 is different from the photographing apparatus 11 shown in FIG. 2 in that a recommended-composition information obtaining unit 131, a direction comparing unit 132, and a display control unit 133 are provided in place of the recommended-composition information obtaining unit 43, the direction comparing unit 45, and the display control unit 33, respectively.

In the present embodiment, recommended-composition information includes, as well as the recommended-angle-of-view information and recommended direction information described above, name information indicating the name of an object (a famous landscape or building) included in the recommended composition.

The recommended-composition information obtaining unit 131 has basically the same function as the recommended-composition information obtaining unit 43 shown in FIG. 2. Further, the recommended-composition information obtaining unit 131 supplies the name information included in the obtained recommended-composition information to the direction comparing unit 132.

The direction comparing unit 132 has basically the same function as the direction comparing unit 45 shown in FIG. 2. Further, the direction comparing unit 132 includes a name information storage unit 132a. The name information storage unit 132a stores the name information supplied from the recommended-composition information obtaining unit 131. When the current direction supplied from the direction detection unit 41 is close to a recommended direction indicated by the recommended direction information, the direction comparing unit 132 supplies the name information in the name information storage unit 132a to the display control unit 133 together with the recommended direction information.

The display control unit 133 has basically the same function as the display control unit 33 shown in FIG. 2. Further, when (a portion of) an object included in the recommended composition appears on a current composition image, the display control unit 133 controls the display unit 34 so as to display the name of the object included in the recommended composition on the current composition image on the basis of the recommended direction information and the name information supplied from the direction comparing unit 132.

Figure 13:
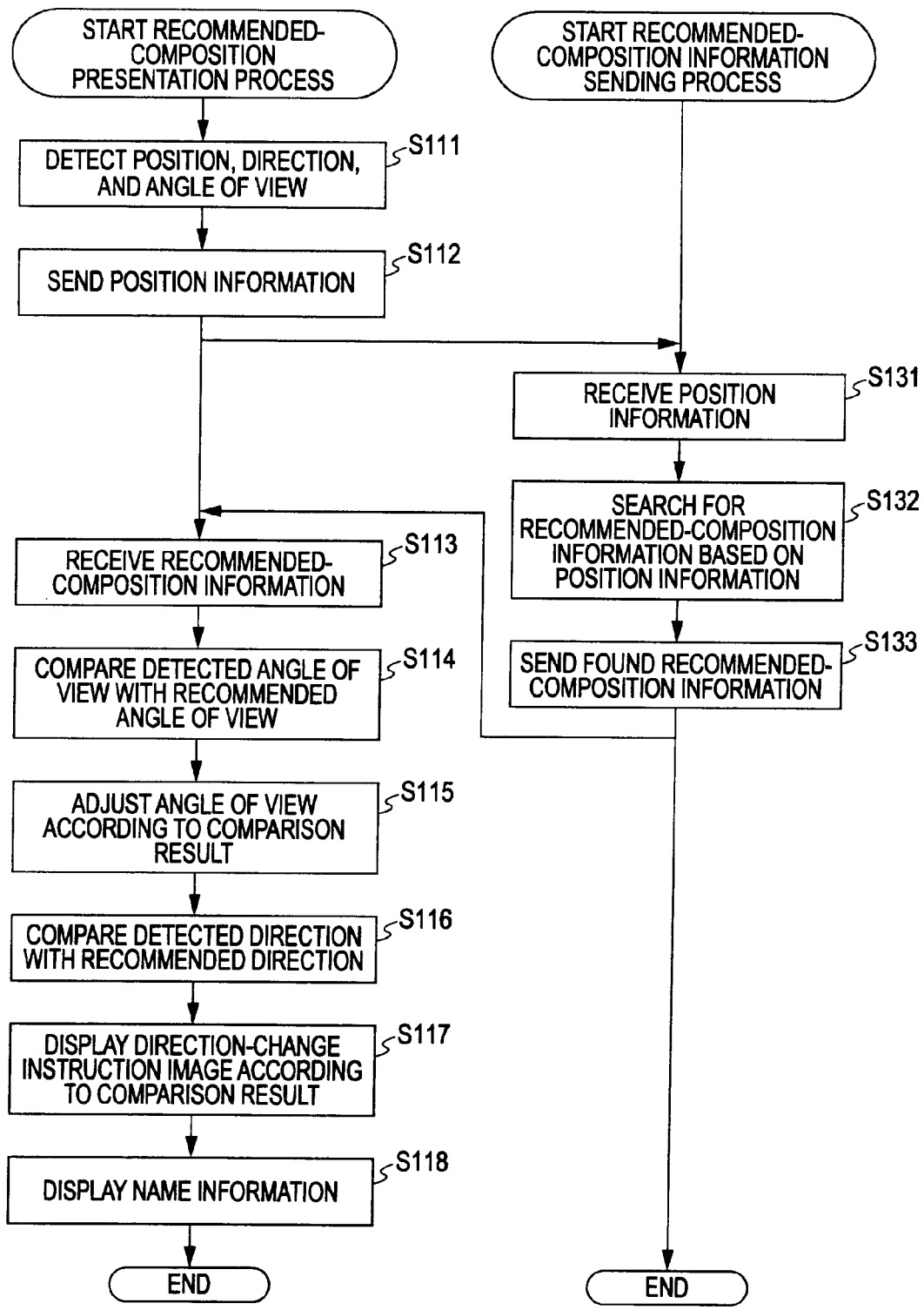
FIG. 13 is a flowchart showing a recommended-composition presentation process of the photographing apparatus shown in FIG. 12.

Next, a recommended-composition presentation process of the photographing apparatus 111 shown in FIG. 12 will be described with reference to a flowchart shown in FIG. 13. The processing of steps S111 to S115 and S131 to S133 in the flowchart shown in FIG. 13 is similar to the processing of steps S11 to S15 and S31 to S33 described with reference to the flowchart shown in FIG. 4, and descriptions thereof are thus omitted.

Note that in step S113, the recommended-composition information obtaining unit 131 of the photographing apparatus 111 supplies recommended-angle-of-view information included in recommended-composition information obtained from the server 12 to the angle-of-view comparing unit 44, and supplies recommended direction information to the direction comparing unit 132. The recommended-composition information obtaining unit 131 also supplies name information to the direction comparing unit 132.

In step S116, the direction comparing unit 132 compares the current direction supplied from the direction detection unit 131 with a recommended direction indicated by the recommended direction information supplied from the recommended-composition information obtaining unit 43, and supplies a comparison result to the display control unit 133. When the current direction supplied from the direction detection unit 41 is close to the recommended direction indicated by the recommended direction information (for example, when the amount of rotation described with reference to FIG. 7 is smaller than a predetermined value), the direction comparing unit 132 supplies the name information stored in the name information storage unit 132a to the display control unit 133 together with the recommended direction information.

In step S117, the display control unit 133 causes the display unit 34 to display a current composition image and a direction-change instruction image on the basis of the comparison result supplied from the direction comparing unit 132 so that the amount of rotation from the $x_1y_1z_1$ coordinates to the $x_2y_2z_2$ coordinates (FIG. 7) can be reduced.

Figure 14:
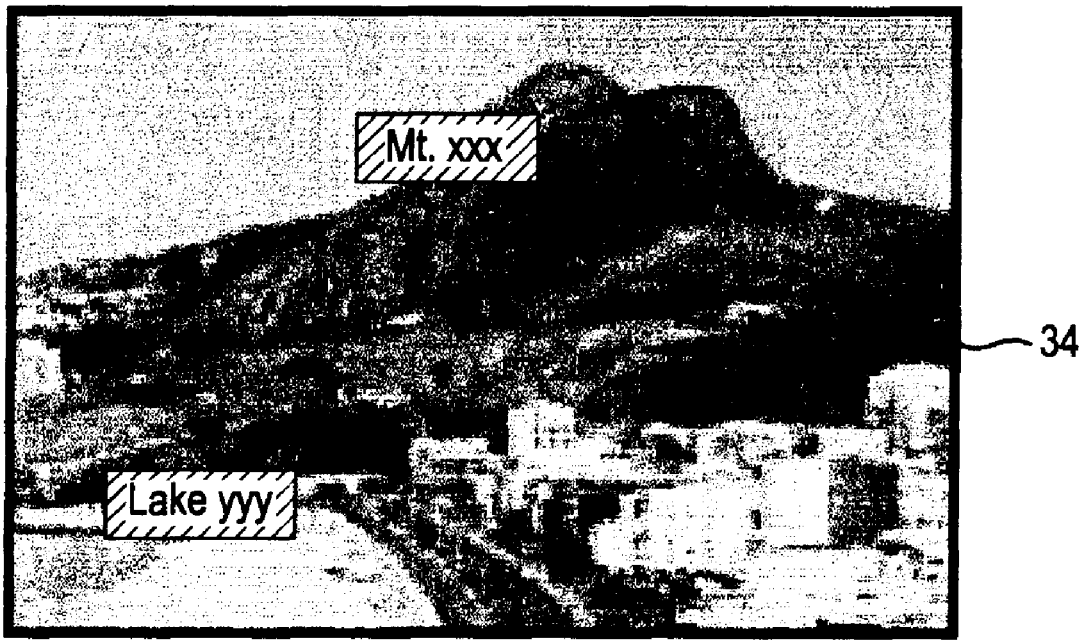
FIG. 14 is a diagram showing an example of a displayed image including the names of objects.

Further, when the recommended direction information and the name information are supplied from the direction comparing unit 132, in step S118, the display control unit 133 controls the display unit 34 on the basis of the recommended direction information and the name information so that, for example, as shown in FIG. 14, the name of an object included in the recommended composition is displayed at a position corresponding to the object in the recommended direction on the current composition image.

Specifically, on the display unit 34 shown in FIG. 14, the name of a mountain as an object, "Mt. xxx", and the name of a lake as an object, "Lake yyy", are displayed in addition to the recommended composition described with reference to FIG. 9. In the example shown in FIG. 14, the names of objects are displayed. The name of a place may also be displayed.

According to the foregoing process, the name of an object can be displayed on the basis of name information included in recommended-composition information. Thus, a photographic point in a sightseeing spot or the like can be presented to a user in a more intelligible manner with a small amount of data. Furthermore, the user can perform photographing while recognizing the object.

In the foregoing description, only the name of an object within a recommended composition is displayed. Alternatively, the names of all objects within a current composition may be displayed on the basis of position information regarding a current position and a current direction.

In the foregoing configuration, a user issues a photographing instruction after a recommended composition is displayed, thereby recording an image having a desired composition. Alternatively, when a recommended composition is displayed, an image having this composition can be automatically photographed (recorded).

Third Embodiment

Figure 15:
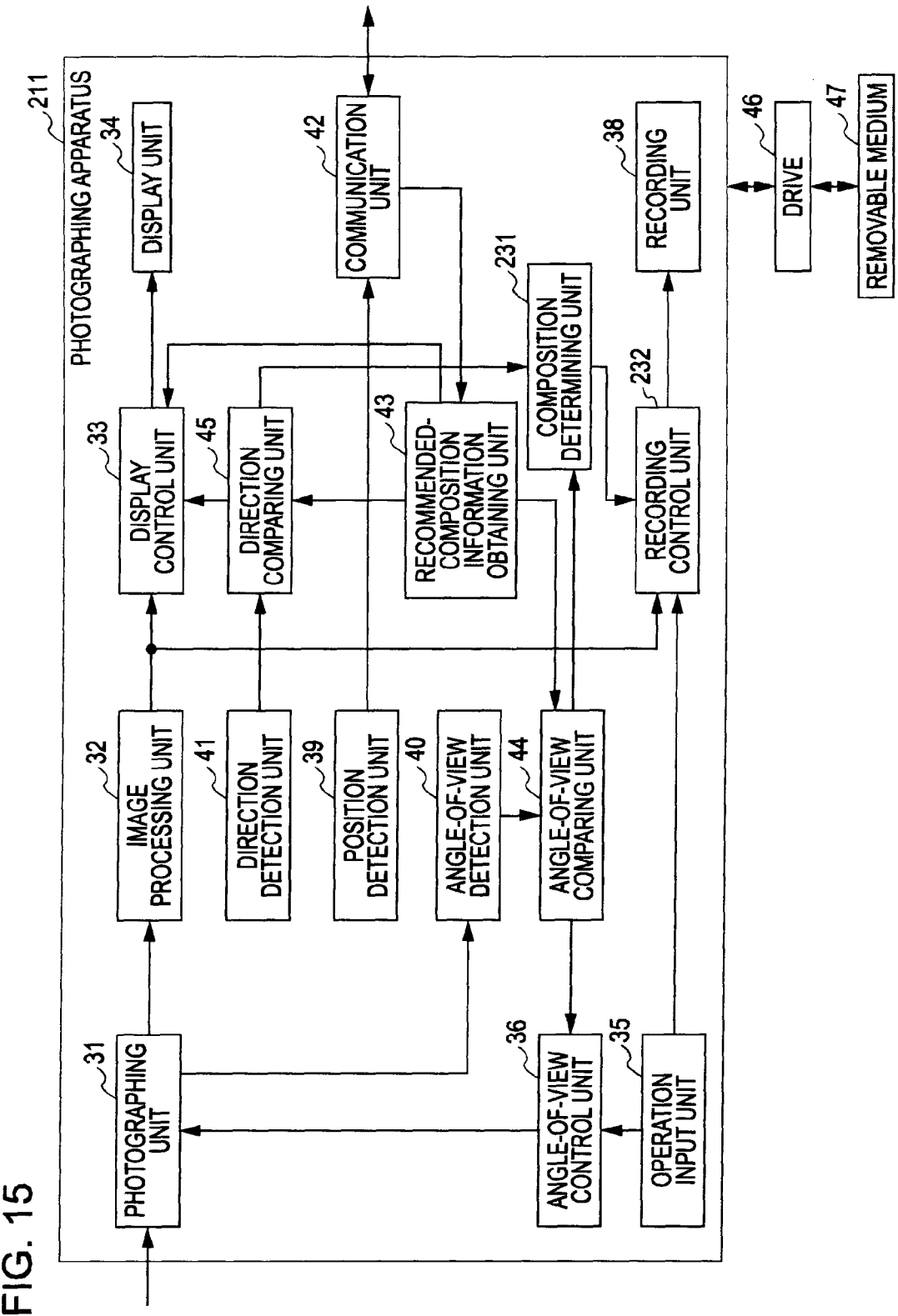
FIG. 15 is a block diagram showing an example functional configuration of a photographing apparatus according to still another embodiment of the present invention.

FIG. 15 shows an example configuration of a photographing apparatus 211 configured such that when a recommended composition is displayed, an image having this composition can be automatically photographed (recorded). In the photographing apparatus 211 shown in FIG. 15, elements having functions similar to those in the photographing apparatus 11 shown in FIG. 2 are assigned the same names and the same reference numerals, and descriptions thereof are omitted as appropriate.

The photographing apparatus 211 shown in FIG. 15 is different from the photographing apparatus 11 shown in FIG. 2 in that a composition determining unit 231 is further provided and a recording control unit 232 is provided in place of the recording control unit 37.

The composition determining unit 231 determines whether or not the current composition has become the recommended composition on the basis of the comparison result obtained from the angle-of-view comparing unit 44 between the current angle of view and the recommended angle of view and the comparison result obtained from the direction comparing unit 45 between the current direction and the recommended direction. If it is determined that the current composition has become the recommended composition, the composition determining unit 231 supplies an instruction signal for instructing recording of image data supplied from the image processing unit 32 to the recording control unit 232.

The recording control unit 232 controls the recording of the image data supplied from the image processing unit 32 onto the recording unit 38 on the basis of the instruction signal from the composition determining unit 231.

Figure 16:
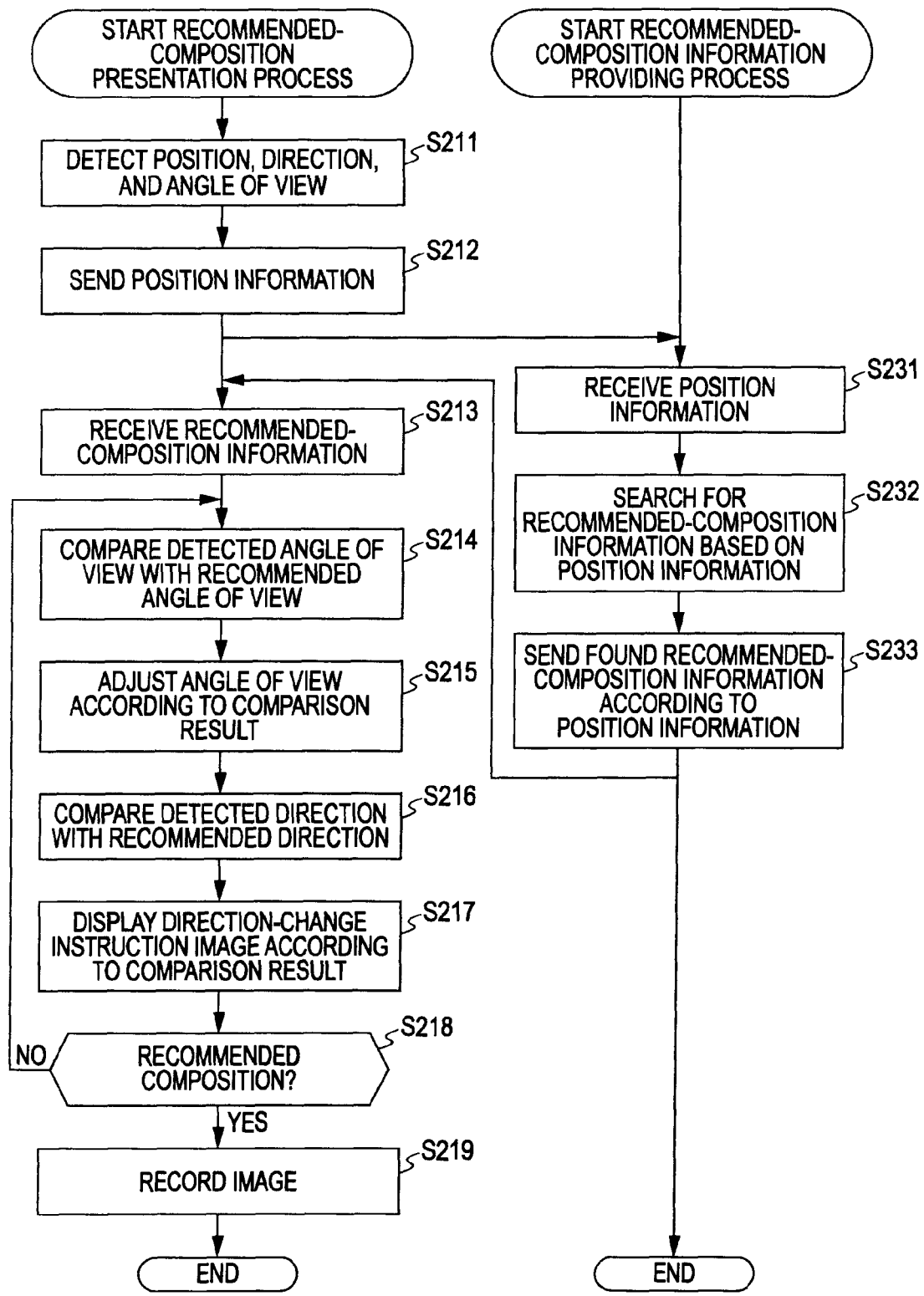
FIG. 16 is a flowchart illustrating a recommended-composition presentation process of the photographing apparatus shown in FIG. 15.

Next, a recommended-composition presentation process of the photographing apparatus 211 shown in FIG. 15 will be described with reference to a flowchart shown in FIG. 16. The processing of steps S211 to S217 and S231 to S233 in the flowchart shown in FIG. 16 is similar to the processing of steps S11 to S17 and S31 to S33 described with reference to the flowchart shown in FIG. 4, and descriptions thereof are thus omitted.

In step S218, the composition determining unit 231 determines whether or not the current composition has become the recommended composition on the basis of the comparison result obtained from the angle-of-view comparing unit 44 between the current angle of view and the recommended angle of view and the comparison result obtained from the direction comparing unit 45 between the current direction and the recommended direction. Specifically, the composition determining unit 231 determines whether or not the difference between the current angle of view and the recommended angle of view is zero and whether or not an amount of rotation between coordinates, which is the comparison result between the current direction and the recommended direction, is zero.

If it is determined in step S218 that the current composition has not become the recommended composition, the process returns to step S214, and the processing of steps S214 to S218 is repeated until the current composition has become the recommended composition.

If it is determined in step S218 that the current composition has become the recommended composition, the composition determining unit 231 supplies an instruction signal for instructing recording of image data supplied from the image processing unit 32 to the recording control unit 232. Then, the process proceeds to step S219.

In step S219, the recording control unit 232 controls the recording of the image data supplied from the image processing unit 32 onto the recording unit 38 on the basis of the instruction signal from the composition determining unit 231.

According to the foregoing process, it is determined whether the current composition is a recommended composition, and when this composition is a recommended composition, an image having this composition is automatically photographed (recorded). This ensures that photographing at a photographic point can be performed.

In the foregoing description, a photographing apparatus obtains recommended-composition information from an external server via a network. If the memory capacity of the photographing apparatus is sufficient, the recommended-composition information may be stored in the photographing apparatus so that the recommended-composition information can be obtained therefrom.

Fourth Embodiment

Figure 17:
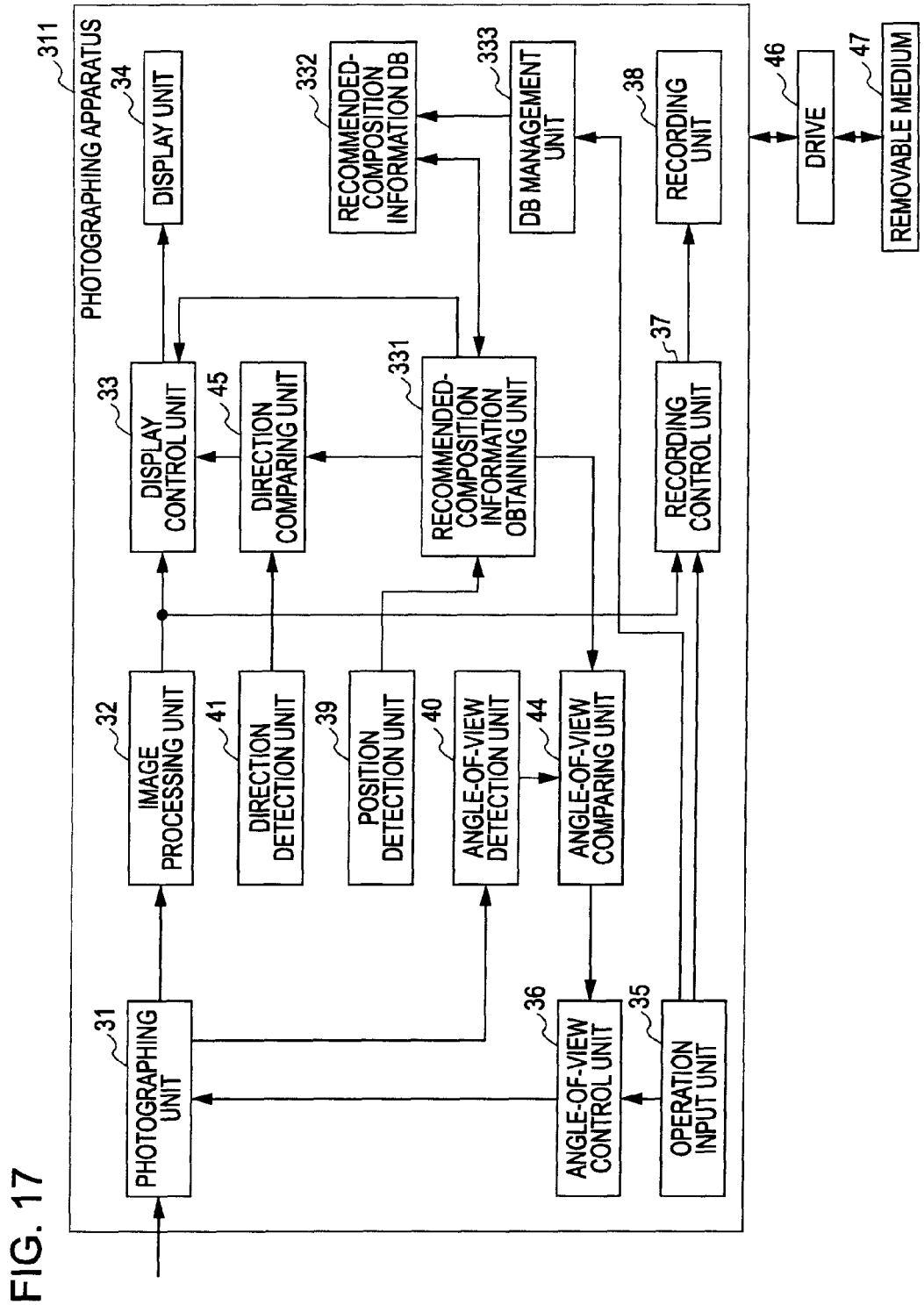
FIG. 17 is a block diagram showing an example functional configuration of a photographing apparatus according to still another embodiment of the present invention.

FIG. 17 shows an example configuration of a photographing apparatus 311 configured such that recommended-composition information can be stored in the photographing apparatus 311 so that the recommended-composition information can be obtained therefrom. In the photographing apparatus 311 shown in FIG. 17, elements having functions similar to those in the photographing apparatus 11 shown in FIG. 2 are assigned the same names and the same reference numerals, and descriptions thereof are omitted as appropriate.

The photographing apparatus 311 shown in FIG. 17 is different from the photographing apparatus 11 shown in FIG. 2 in the following points: The communication unit 42 is removed, a recommended-composition information obtaining unit 331 is provided in place of the recommended-composition information obtaining unit 43, and a recommended-composition information DB 332 and a DB management unit 333 are further provided.

The recommended-composition information obtaining unit 331 searches the recommended-composition information DB 332 for, based on position information indicating the current position of the photographing apparatus 311, which is supplied from the position detection unit 39, recommended-composition information corresponding to the position information, and obtains the found recommended-composition information. The recommended-composition information obtaining unit 331 supplies recommended-angle-of-view information included in the obtained recommended-composition information to the angle-of-view comparing unit 44, and also supplies recommended direction information included in the recommended-composition information to the direction comparing unit 45.

The recommended-composition information DB 332 stores, under management of the DB management unit 333, position information indicating photographing positions, which has been input from the operation input unit 35, and recommended-composition information indicating recommended compositions at the photographing positions so that the position information and the recommended-composition information are associated with each other.

The DB management unit 333 manages the data stored in the recommended-composition information DB 332 (that is, the position information and the recommended-composition information), and performs processing such as addition, update, or deletion of data in accordance with an instruction from the operation input unit 35.

Figure 18:
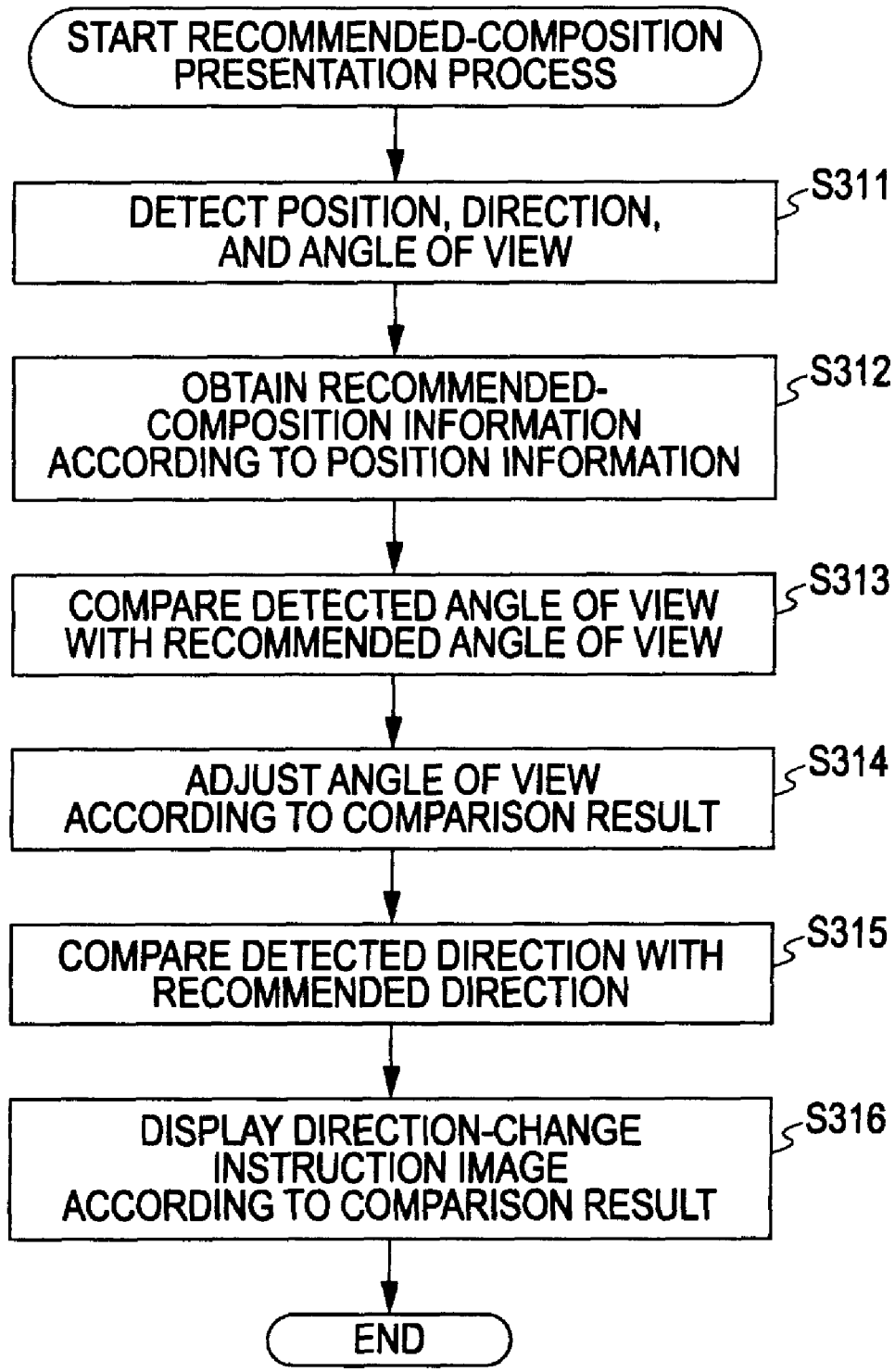
FIG. 18 is a flowchart illustrating a recommended-composition presentation process of the photographing apparatus shown in FIG. 17.

Next, a recommended-composition presentation process of the photographing apparatus 311 shown in FIG. 17 will be described with reference to a flowchart shown in FIG. 18. The processing of steps S311 and S313 to S316 in the flowchart shown in FIG. 18 is similar to the processing of steps S11 and S14 to S17 described with reference to the flowchart shown in FIG. 4, and descriptions thereof are thus omitted.

In step S312, the recommended-composition information obtaining unit 331 searches the recommended-composition information DB 332 for, based on position information indicating the current position of the photographing apparatus 311, which is supplied from the position detection unit 39, recommended-composition information corresponding to the position information, and obtains the found recommended-composition information. The recommended-composition information obtaining unit 331 supplies recommended-angle-of-view information included in the obtained recommended-composition information to the angle-of-view comparing unit 44, and also supplies recommended direction information included in the recommended-composition information to the direction comparing unit 45.

The foregoing process only involves obtaining recommended-composition information corresponding to a current position from an internal memory of a photographing apparatus. Thus, a photographic point in a sightseeing spot or the like can be presented to a user with a small amount of data. Furthermore, even in an environment where the photographing apparatus is not allowed to communicate with an external server or the like, a photographic point in a sightseeing spot or the like can be presented to the user.

The series of processes described above can be executed by hardware or software. When the series of processes is executed by software, a program constituting the software is installed from a program recording medium into a computer incorporated in dedicated hardware or a device capable of executing various functions by installing therein various programs, such as a general-purpose computer.

The program recording medium storing a program that is installed in a computer and that is executable by the computer may be implemented by, as shown in FIG. 2, the removable medium 47 which may be a package medium such as a magnetic disk (including a flexible disk), an optical disk (including a compact disc-read only memory (CD-ROM), a digital versatile disc (DVD)), or a magneto-optical disk), a semiconductor memory, or the like, a ROM (not shown) temporarily or permanently storing a program, a hard disk that constitutes the recording unit 38, or the like. The program may be stored in the program recording medium, if necessary, through the communication unit 42 which may be an interface such as a router or a modem via wired or wireless communication medium such as the network 13, a local area network, the Internet, or digital satellite broadcasting.

A program executed by a computer may be a program according to which processes are performed in time sequence in accordance with the order described herein or a program according to which processes are performed in parallel or at a desired time such as at the time of calling.

Embodiments of the present invention are not limited to the foregoing embodiments, and a variety of modifications can be made without departing from the scope of the present invention.

The present application contains subject matter related to that disclosed in Japanese Priority Patent Application JP 2008-229309 filed in the Japan Patent Office on Sep. 8, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A photographing apparatus comprising:
   photographing means for photographing an object;
   position detecting means for detecting a position of the photographing apparatus;
   direction detecting means for detecting a direction in which the photographing apparatus is oriented when the photographing means photographs the object;
   angle-of-view detecting means for detecting an angle of view of an image photographed by the photographing means;
   recommended-composition information obtaining means for obtaining recommended-composition information based on the position detected by the position detecting means, the recommended-composition information including a recommended angle of view of the image photographed at the position and a recommended direction of the photographing apparatus;
   angle-of-view comparing means for comparing the angle of view detected by the angle-of-view detecting means with the recommended angle of view;
   angle-of-view adjusting means for adjusting the angle of view detected by the angle-of-view detecting means in accordance with a comparison result obtained by the angle-of-view comparing means;
   direction comparing means for comparing the direction detected by the direction detecting means with the recommended direction; and
   presenting means for presenting, in accordance with a comparison result obtained by the direction comparing means, direction-change instruction information for instructing changing of the direction in which the photographing apparatus is oriented when the photographing means photographs the object.

2. The photographing apparatus according to claim 1, wherein the presenting means presents, in accordance with a comparison result obtained by the direction comparing means, an image of the object and a direction-change instruction image for instructing changing of the direction in which the photographing apparatus is oriented when the photographing means photographs the object.

3. The photographing apparatus according to claim 2, further comprising composition determining means for determining whether or not the image presented by the presenting means has a recommended composition, the recommended composition being indicated by the recommended-composition information, and instructing recording of the image when the image has the recommended composition.

4. The photographing apparatus according to claim 2, wherein the recommended-composition information further includes a name of the object in an image photographed at the position with the recommended angle of view and in the recommended direction, and
   wherein the presenting means presents the name on the image of the object.

5. The photographing apparatus according to claim 1, wherein the recommended-composition information obtaining means obtains the recommended-composition information from recommended-composition information storage means for storing the recommended-composition information, the recommended-composition information storage means being provided in an information processing apparatus externally connected to the photographing apparatus.

6. The photographing apparatus according to claim 1, further comprising recommended-composition information storage means for storing the recommended-composition information,
   wherein the recommended-composition information obtaining means obtains the recommended-composition information from the recommended-composition information storage means.

7. A photographing method comprising the steps of:
   photographing an object;
   detecting a position of a device that photographs the object;
   detecting a direction in which the device is oriented when the object is photographed in the step of photographing;
   detecting an angle of view of an image photographed in the step of photographing;
   obtaining recommended-composition information based on the position detected in the step of detecting a position, the recommended-composition information including a recommended angle of view of the image photographed at the position and a recommended direction;
   comparing the angle of view detected in the step of detecting an angle of view with the recommended angle of view;
   adjusting the angle of view detected in the step of detecting an angle of view in accordance with a comparison result obtained in the step of comparing the angle of view;
   comparing the direction detected in the step of detecting a direction with the recommended direction; and
   presenting, in accordance with a comparison result obtained in the step of comparing the direction, direction-change instruction information for instructing changing of the direction in which the device is oriented when the object is photographed in the step of photographing.

8. A non-transitory computer-readable medium loaded with a computer program for causing a computer to execute a process comprising the steps of:
   controlling photographing of an object;
   detecting a position of a device that photographs the object;
   detecting a direction in which the device is oriented when the object is photographed in the step of controlling photographing;
   detecting an angle of view of an image photographed in the step of controlling photographing;
   obtaining recommended-composition information based on the position detected in the step of detecting a position, the recommended-composition information including a recommended angle of view of the image photographed at the position and a recommended direction;

comparing the angle of view detected in the step of detecting an angle of view with the recommended angle of view;

adjusting the angle of view detected in the step of detecting an angle of view in accordance with a comparison result obtained in the step of comparing the angle of view;

comparing the direction detected in the step of detecting a direction with the recommended direction; and performing control to present, in accordance with a comparison result obtained in the step of comparing the direction, direction-change instruction information for instructing changing of the direction in which the device is oriented when the object is photographed in the step of controlling photographing.

9. A photographing apparatus comprising:

a photographing unit configured to photograph an object;

a position detecting unit configured to detect a position of the photographing apparatus;

a direction detecting unit configured to detect a direction in which the photographing apparatus is oriented when the photographing unit photographs the object;

an angle-of-view detecting unit configured to detect an angle of view of an image photographed by the photographing unit;

a recommended-composition information obtaining unit configured to obtain recommended-composition information based on the position detected by the position detecting unit, the recommended-composition information including a recommended angle of view of the image photographed at the position and a recommended direction;

an angle-of-view comparing unit configured to compare the angle of view detected by the angle-of-view detecting unit with the recommended angle of view;

an angle-of-view adjusting unit configured to adjust the angle of view detected by the angle-of-view detecting unit in accordance with a comparison result obtained by the angle-of-view comparing unit;

a direction comparing unit configured to compare the direction detected by the direction detecting unit with the recommended direction; and a presenting unit configured to present, in accordance with a comparison result obtained by the direction comparing unit, direction-change instruction information for instructing changing of the direction in which the photographing apparatus is directed when the photographing unit photographs the object.

* * * * *